(12) United States Patent
Krohn

(10) Patent No.: US 10,927,518 B2
(45) Date of Patent: Feb. 23, 2021

(54) THIRD RAIL HEATER CONTROL SYSTEM

(71) Applicant: M.C. Dean, Inc., Tysons, VA (US)

(72) Inventor: Walter Krohn, McGaheysville, VA (US)

(73) Assignee: M.C. DEAN INC., Tysons, VA (US)

( * ) Notice: Subject to any disclaimer, the term of this patent is extended or adjusted under 35 U.S.C. 154(b) by 0 days.

(21) Appl. No.: 16/778,793

(22) Filed: Jan. 31, 2020

(65) Prior Publication Data
US 2020/0256024 A1     Aug. 13, 2020

Related U.S. Application Data

(60) Provisional application No. 62/804,246, filed on Feb. 12, 2019, provisional application No. 62/803,891, filed on Feb. 11, 2019.

(51) Int. Cl.
*E01H 8/08*     (2006.01)
*E01B 7/20*     (2006.01)
(Continued)

(52) U.S. Cl.
CPC ............ *E01H 8/08* (2013.01); *E01B 7/20* (2013.01); *E01B 7/24* (2013.01); *E01B 19/00* (2013.01)

(58) Field of Classification Search
CPC ... E01B 7/20; E01B 7/24; E01B 19/00; B61L 1/20; B61L 23/04; B61L 27/0088; E01H 8/08
See application file for complete search history.

(56) References Cited

U.S. PATENT DOCUMENTS 2,090,156 A * 8/1937 Scholz .................... E01B 19/00
                                                                       219/545
5,824,997 A * 10/1998 Reichle .................... E01B 7/24
                                                                       219/537

(Continued)

FOREIGN PATENT DOCUMENTS

WO     2014/033036 a2     3/2014
WO     2014033036 A2     3/2014

OTHER PUBLICATIONS

Notification of Transmittal of the International Search Report and the Written Opinion of the International Searching Authority, or the Declaration, International Application No. PCT/US2020/017582, dated Jun. 4, 2020, 7 pages.

*Primary Examiner* — Zachary L Kuhfuss
(74) *Attorney, Agent, or Firm* — Roberts Calderon Safran & Cole P.C.

(57) ABSTRACT

A system for remotely controlling third rail ribbon heaters is provided for preventing the accumulation of ice and snow on the rails. The system includes a plurality of switching assemblies that control a flow of electric current from the third rail of a railway to ribbon heaters mounted on the third rail. A remotely located digital controller provides switching commands to the switching assemblies via a radio link. The switching assemblies include current and voltage sensors that continuously provide current and voltage information that allows the digital controller to accurately predict when a heater failure condition is likely to occur so that ribbon heaters may be preemptively and safely replaced before failure. Each of the switching assemblies is contained in a junction box that includes both a door panel and a safety switch that disconnects the switching assembly from third rail current when the door panel is opened for improved safety.

20 Claims, 20 Drawing Sheets

(51) Int. Cl.
 *E01B 7/24* (2006.01)
 *E01B 19/00* (2006.01)

(56) References Cited

U.S. PATENT DOCUMENTS

| | | |
|---|---|---|
| 6,995,666 B1 | 2/2006 | Luttrell |
| 7,274,305 B1 | 9/2007 | Luttrell |
| 9,330,562 B2 | 5/2016 | Fox |
| 9,353,486 B2 | 5/2016 | Honeck et al. |
| 2013/0220991 A1 | 8/2013 | Honeck et al. |
| 2014/0111321 A1 | 4/2014 | Fox |
| 2016/0258124 A1 | 9/2016 | Johnston |
| 2019/0106845 A1* | 4/2019 | Clyne ..................... E01B 7/24 |

* cited by examiner

THIRD RAIL HEATER CONTROL SYSTEM

FIELD OF THE INVENTION

This invention relates to systems for controlling the electrical-resistance heaters used to prevent the formation of ice on the third rail of electrically-powered railways.

BACKGROUND OF THE INVENTION

Third rail heater systems are generally known in the prior art. The purpose of such heaters is to prevent the accumulation of ice on the third rail of an electrically-powered railway that would otherwise interfere with electrical contact between the contact plate of an electrically-powered train car and the 750 volt DC current that is conducted through the third rail.

In such systems, long strip-like electrical resistance heaters (known as "ribbon heaters" or "heat tape" in the art) are mounted flush along the outer side of the central flange of the "I"-shaped cross-section of the third rail. Each of the ribbon heaters is electrically connected to the third rail so as to be powered by the 750 volts DC that such rails conduct. Current flow to the ribbon heaters is controlled by switches contained within junction boxes positioned adjacent to the railroad tracks. In conditions where ice and snow are imminent, the control switches in the junction boxes are closed in order to actuate the ribbon heaters.

In older third rail heater systems, the control switches were manually closed at the beginning of the winter season and left on until spring. However, such systems are wasteful of electric power as there are often many days during the winter season when such third rail track heating is unnecessary. As a result, automatic systems were developed that allow a system operator to selectively and remotely close or open the ribbon heater switches on an as-needed basis during the winter months.

SUMMARY OF THE INVENTION

Electrically-powered railway tracks are an inherently dangerous environment. In addition to the 750 volts DC carried by the third rail (which only needs to be touched once accidentally to cause death), the other two running rails that the train wheels ride may also be electrified on an intermittent basis from, for example, the braking current generated by the motor of an electric train car, or an AC current applied by a code reading device used for train position monitoring. Such intermittent currents may have voltages high enough (e.g. ~100 volts) to be life threatening. Additionally, many maintenance and repair operations (such as the replacement of a burned out ribbon heater, or components within a junction box) are carried out under conditions of snow and ice where the exact location of dangerous rails and connections is concealed, and where the terrain is slippery. Finally, most maintenance and repair operations are conducted at night, when railway traffic is at a minimum. On the plus side, such timing reduces the probability of the maintenance operator being struck by a moving train car. On the negative side, it greatly increases the chances of accidental contact with the 750 volts DC current on either the third rail itself, or on an exposed contact in the junction box. As a result of such hazardous conditions, electric train maintenance personnel are exposed to a very real danger of accidental electrocution.

While the prior art automatic third rail heater control systems substantially reduce power consumption and costs, the applicant has observed five shortcomings in the design of such systems that render the maintenance and operation unduly hazardous to the operators of such systems. First, there is no provision in such prior art systems for sensing, recording, and processing the type of data that could accurately predict when a failure condition of a ribbon heater is likely to occur. Such a capability would be far more advantageous than a system that merely generated an alarm signal when a failure condition was present, as it would allow maintenance personnel to routinely and preemptively replace or repair ribbon heaters or junction box components under favorable weather conditions when visibility is good and ice and snow is not present, as opposed to emergency conditions during a snowstorm at night. Second, the junction boxes containing the control switches often have exposed contacts carrying 750 volts DC from the third rail. While there may be an internal or external "kill" switch to break the connection of the third rail current to the switching components of the box, a hazardous shock condition will be present if the maintenance operator neglects to open such a switch. In the case of an internal "kill" switch, the need to locate and to manually operate the switch—which is necessarily close to open contacts carrying the 750 volts DC operating current—can be hazardous, particularly in snowstorm conditions at night. Thirdly, there is no provision in prior art systems for safely and conveniently powering up the switching assembly for diagnostic purposes when the 750 volts DC from the third rail is cut off. Fourth, while many prior art systems utilize radio links to communicate switching commands between a central controller and local junction boxes, the strength and reliability of such radio links can be compromised by the distances between the central controller and junction boxes, the EMI generated by the electrical activity in the train stations, and poor weather conditions. Accordingly there is a need for a design having wireless links that operates with the reliability of hard-wired links. Finally, there is no capacity in prior art systems to periodically self-diagnose in real time order to confirm that all critical components are performing normally.

To these ends, the third rail heater control system of the invention includes a digital controller, and a plurality of switching assemblies contained in junction boxes located proximate to the third rail of a railway and remotely from the digital controller. The switching assemblies control a flow of current from the third rail to a plurality of ribbon heaters mounted along the length of the third rail. Each switching assembly comprises (1) a plurality of electrically-controlled switches, each of which selectively switches electrical current from the third rail to one of the plurality of ribbon heaters; (2) a switch controller including a programmable logic circuit connected to a radio transceiver linked to the digital controller, the switch controller providing control signals to each of the plurality of electrically-controlled switches in response to switching commands received from the digital controller; (3) current sensors that continuously provide a signal indicative of current flow through each ribbon heater to the digital controller, and (4) a voltage sensor that continuously provides a signal indicative of the voltage applied to each ribbon heater to the digital controller.

The current sensors are sufficiently sensitive to provide a signal indicative of a difference in current draw when one of the heating elements within the ribbon heater being monitored ceases to draw power. In practice, this requires the current sensors to have a sensitivity of at least 0.2 amps, as the individual heating coils within commercially-available ribbon heater typically draw this much current at 750 volts DC.

In operation, the current sensors and the voltage sensor of each switching assembly continuously provide signals indicative of changes in the current flow as well as surges in the voltage applied to the ribbon heaters which, as explained in more detail later, are largely caused by the regenerative braking of trains along the tracks. This current and voltage information is continuously transmitted to and recorded by the remotely located digital controller. By monitoring the occurrence of initial heater element failures and the length and magnitude of voltage surges applied to each of the ribbon heaters, the digital controller can accurately predict when a particular ribbon heater will no longer have the capacity to effectively prevent the formation of ice on the third rail during freezing conditions, thereby allowing the ribbon heater to be pre-emptively replaced during favorable weather conditions.

The junction box includes a door panel that provides access to the switching assembly, and a safety switch that disconnects the switching assembly from third rail current when the door panel is opened, thus avoiding any danger of electric shock during maintenance operations of the switching assembly. The safety switch is linked to the handle of the door panel so that the 750 volts DC of the third rail is automatically disconnected from the switching assembly whenever the handle is operated. This configuration obviates the need for locating and operating a manual kill switch after the door panel has been opened.

The system further comprises a portable power supply for powering the switch controller during maintenance operations when the door panel has been opened and the incoming 750 volt current has been cut by the safety switch. In the preferred embodiment, the portable power supply is a battery pack. The switch controller of the switching assembly is advantageously designed to operate on less than 30 volts. Hence the portable power supply of the system needs to provide only a non-lethal 30 or less volt current in order to operate the switch controller when the door panel is opened and the safety switch is actuated.

The digital controller includes local relay units at railway stations and/or power substations, each of which includes a radio transceiver in communication with the transceiver of the switch controller, and a master control station located remotely with respect to the local relay units. The master control station is connected to the local relay units via an optical fiber cable. Such architecture minimizes the operational distance of the radio link between the wireless controller and the digital controller, thereby increasing the overall robustness of the communication links of the system.

The master control station automatically runs a self-diagnostic procedure every time it is started up. Upon initial actuation of the local control units, the master control station first determines whether or not an electrical current is present in the third rail connected to the junction box. Next, it proceeds to test the operability of other components of each of the switching assemblies. Finally, the master control station connects the strip heaters to the electrical current from the third rail in sequential fashion such that the electrical load on the third rail is gradually applied. The master control station also is equipped with precipitation and temperature sensors that monitor the outside weather conditions for ice and snow and will automatically energize the heat tape system. These sensors may be located in multiple places along the rail tracks and operate only the heater sections needed based on the local weather conditions. This provides for fully automatic operation as well as maximum energy savings.

DETAILED DESCRIPTION OF THE PREFERRED EMBODIMENT

Figure 1:
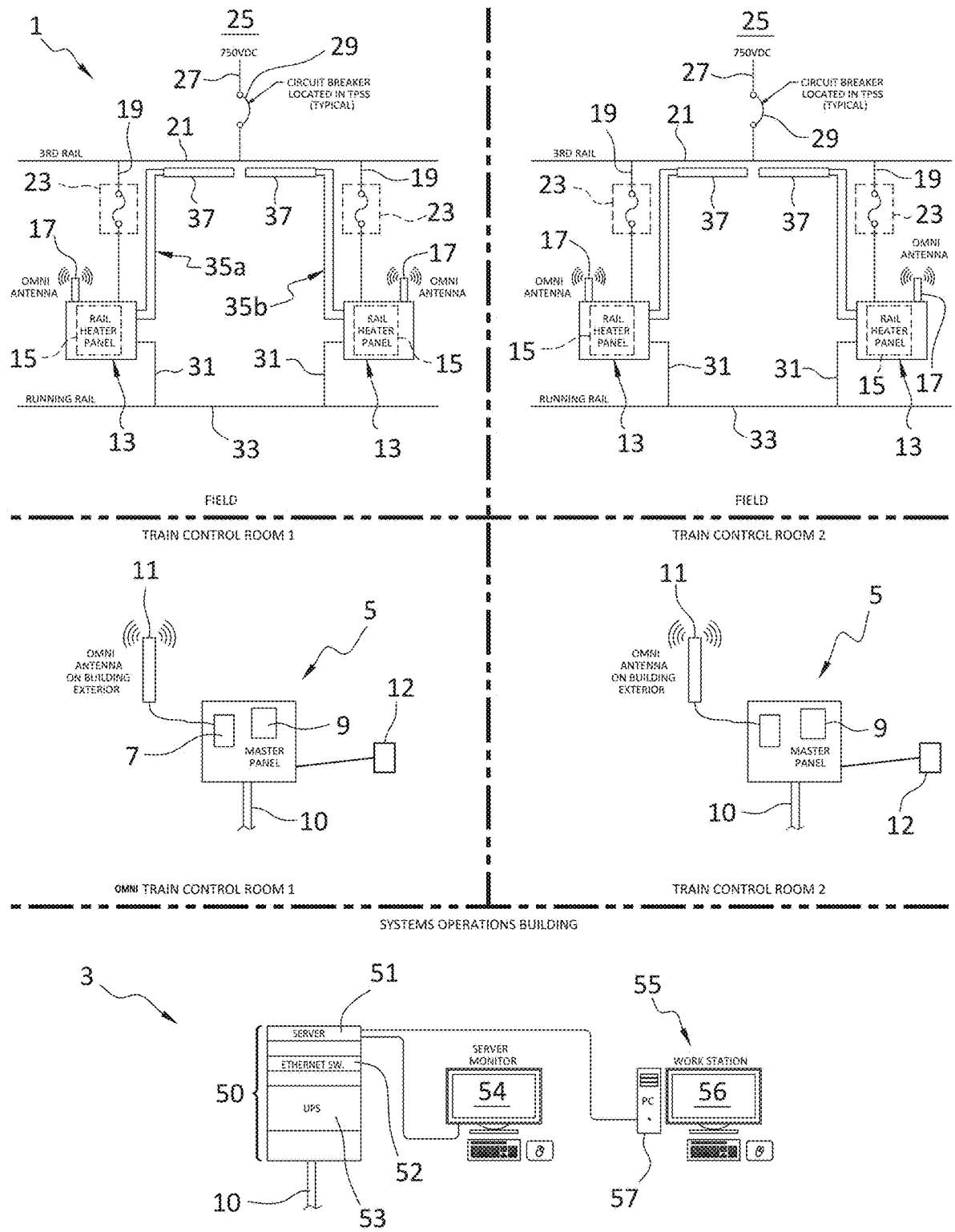
FIG. 1 is a schematic diagram of the third rail heater system of the invention, illustrating the digital control unit, the local relay units and junction boxes that form the system.

With reference to FIG. 1, the third rail heater control system 1 of the invention generally comprises a master control station 3 remotely located from the railway stations, a plurality of local relay units 5 located in the railway stations (which together form the digital controller of the system), and a plurality of trackside junction boxes 13.

The local relay units 5 each include a transceiver 7 connected to a programmable logic circuit (PLC) 9. The local relay units 5 are optically coupled to the master control station 3 via an optical cable 10, and are radio linked the relatively short distances to the junction boxes 13 via an antenna 11 connected to the output of the transceiver 7. Such an architecture advantageously obviates the need to install a communications cable in the relatively harsh trackside environment where the junction boxes 13 are mounted, while keeping the length of the radio link short, thereby minimizing the chance that the radio link will be degraded or rendered inoperative by outside electromagnetic interference. The local relay units 5 further include ice and snow sensors 12 connected to their respective programmable logic circuits 9 via a cable as shown. Each snow and ice sensors 12 is ground-mounted in an open area near the railway station. In the preferred embodiment, the snow and ice sensors are LCD-8 type model number 24619 snow switches manufactured by ETI located in South Bend, Indiana. In operation, the local relay units 5 relay instructional commands between the master control station 3 and the junction boxes 13, as well as data collected by sensors in the junction boxes 13 to the master control station 3 for storage. The local relay units 5 further relay a snow condition signal to the master control station 3 in the event that its respective snow and ice sensor 12 detects whether a snow condition is present, whereupon the master control station 3 automatically issues a ribbon heater start-up command to the junction boxes 13 within the particular zone serviced by the local relay unit 5.

With further reference to FIG. 1, each of the junction boxes 13 houses a switching assembly 15 that will be described in detail hereinafter. An antenna 17 radio-links the switching assembly 15 to one of the local relay units 5 as previously indicated. An input cable 19 connected to the 750 volts DC third rail 21 of the railway is connected to an input terminal of the switching assembly 15. Input cable includes a shoebox fuse 23 as indicated. A connecting cable 27 in turn connects the third rail 21 to a 750 volt DC source 25 via a circuit breaker 29. A ground cable 31, which forms the other pole of the 750 volt DC current applied to the switching assembly 15, is connected between an output terminal of the switching assembly 15 and one of the running rails 33 of the railway. Finally, each of the junction boxes 13 includes output cables 35*a*, 35*b* connected to a ribbon heater 37. While only one set of output cables 35*a*, 35*b* is shown in FIG. 1, each junction box 13 preferably has four pairs of such output cables in order to control electric power to four different ribbon heaters 37*a-d*.

Figure 2:
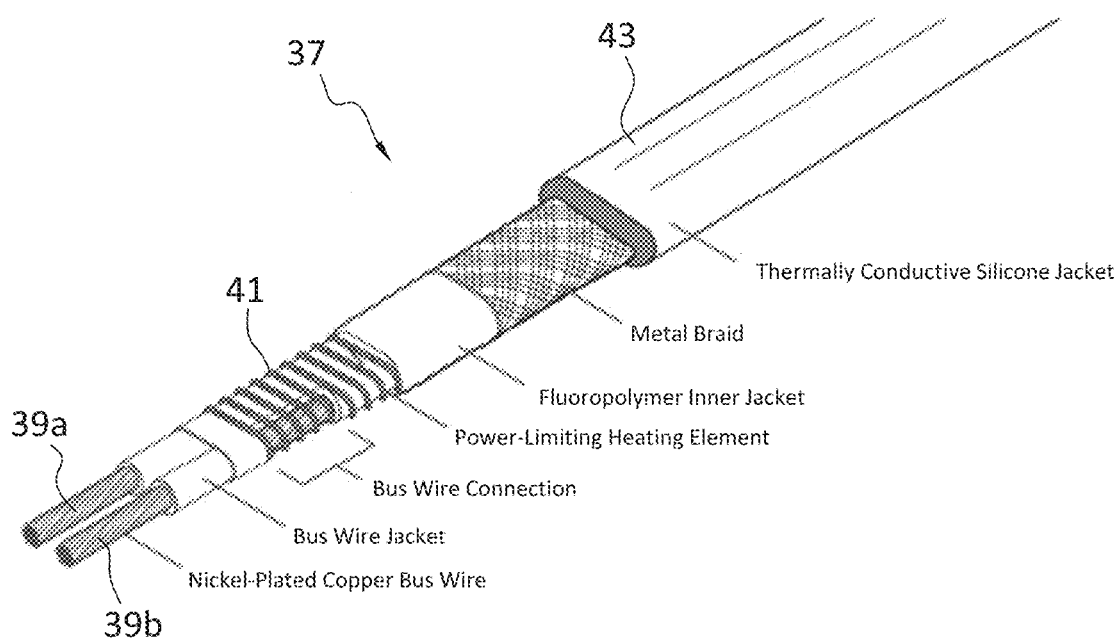
FIG. 2 is a perspective cutaway view of one type of ribbon heater that the system of the invention controls, illustrating the various layers and components of the heater.
Figure 3:
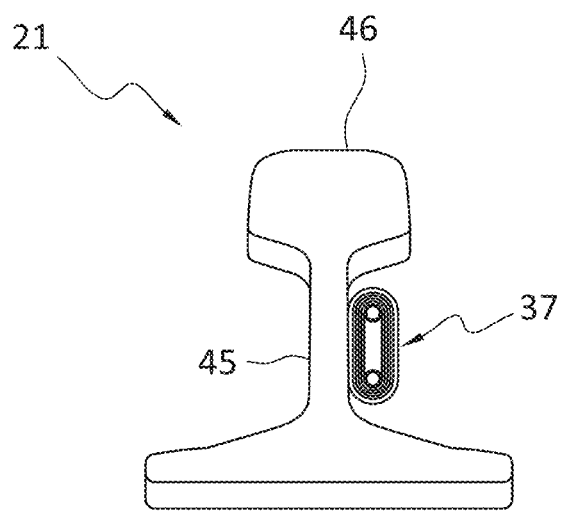
FIG. 3 is a cross-sectional view of a third rail with a ribbon heater mounted on the central flange of the rail.

With reference now to FIGS. 2 and 3, the ribbon heaters 37 controlled by the system 1 of the invention included a pair of conductive bus wires 39*a*, 39*b*. One bus wire 39*a* is connected to the 750 volt DC current from the third rail 21, while the other bus wire 39*b* is connected to the ground cable 31. A plurality of heating elements 41 are serially arranged along the 500 foot length of the ribbon heater 37. Each heating element 41 is spirally wound around a layer of insulation covering the pair of conductive bus wires 39*a*, 39*b*, with opposite ends of the heating elements 41 connected respectively to the pair of conductive bus wires 39*a*, 39*b*. The heating elements 41 are covered over by a thermally-conductive jacket 43 formed from a silicone compound. In this example of the invention, each of the heating elements 41 draws about 0.2 amps. As is indicated in FIG. 3, one of the flat sides of the jacket 43 of the ribbon heater 37 is attached to the central flange 45 of the third rail 21 in order to keep ice from accumulating on the upper electrical contact surface 46.

With reference again to FIG. 1, the master control station 3 is preferably a supervisory control and data acquisition (SCADA) network system that includes a server section 50 having a server 51, an Ethernet switch 52, and an uninterruptible power supply (UPS) 53 as shown. The server section 50 is connected to the local relay units 5 via the optical cable 10. The master control station 3 further includes a server display monitor 54 connected to the server 51 of the server section 50 for maintenance of the server 51, as well as a work station 55 having a display monitor 56 connected to a personal computer 57.

Figure 4A:
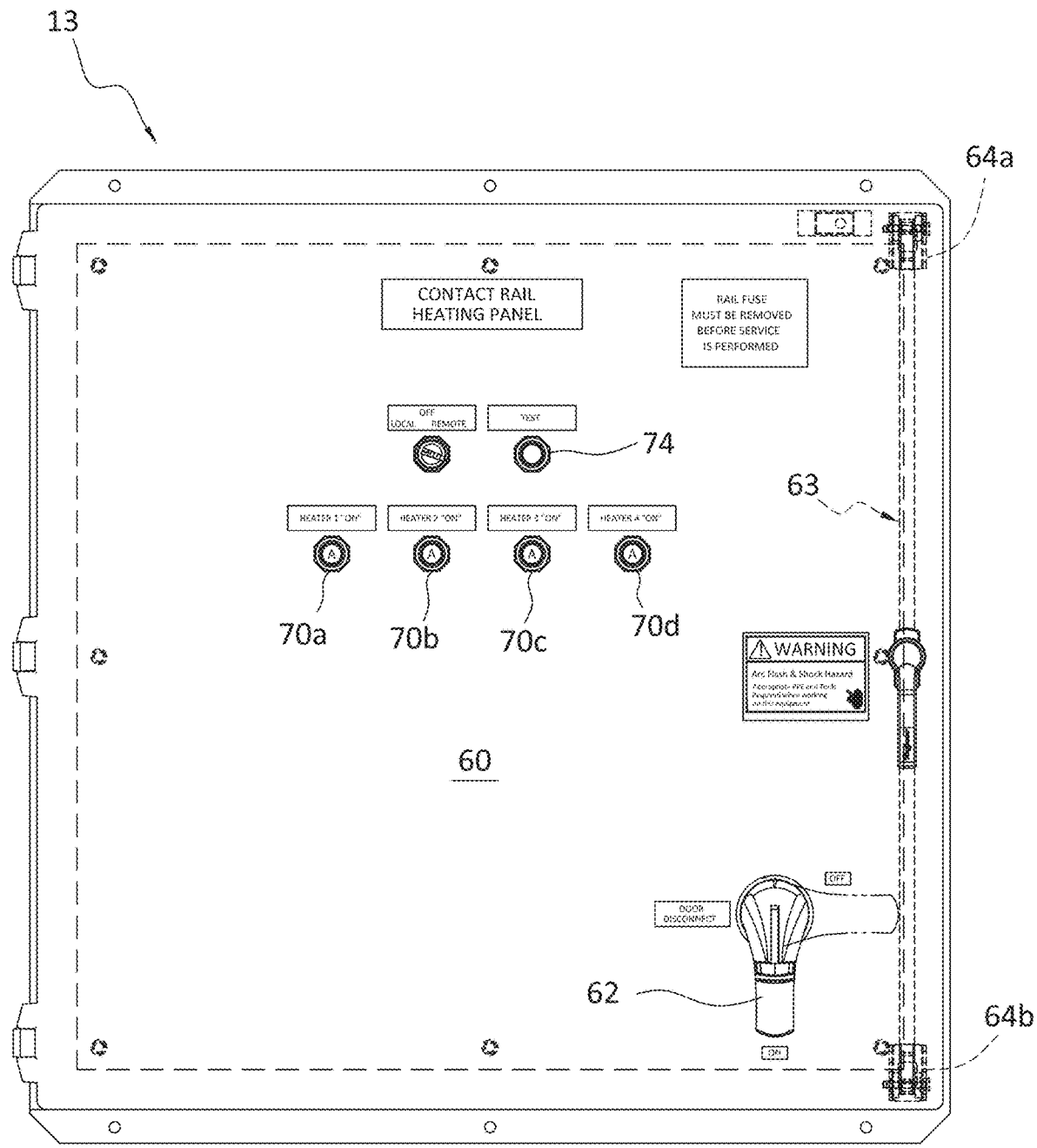
FIG. 4A is a front view of a junction box of the system, showing both the handle of the door panel and the indicator lights that indicate the "on-off" status of the particular ribbon heaters powered by the junction box.
Figure 4B:
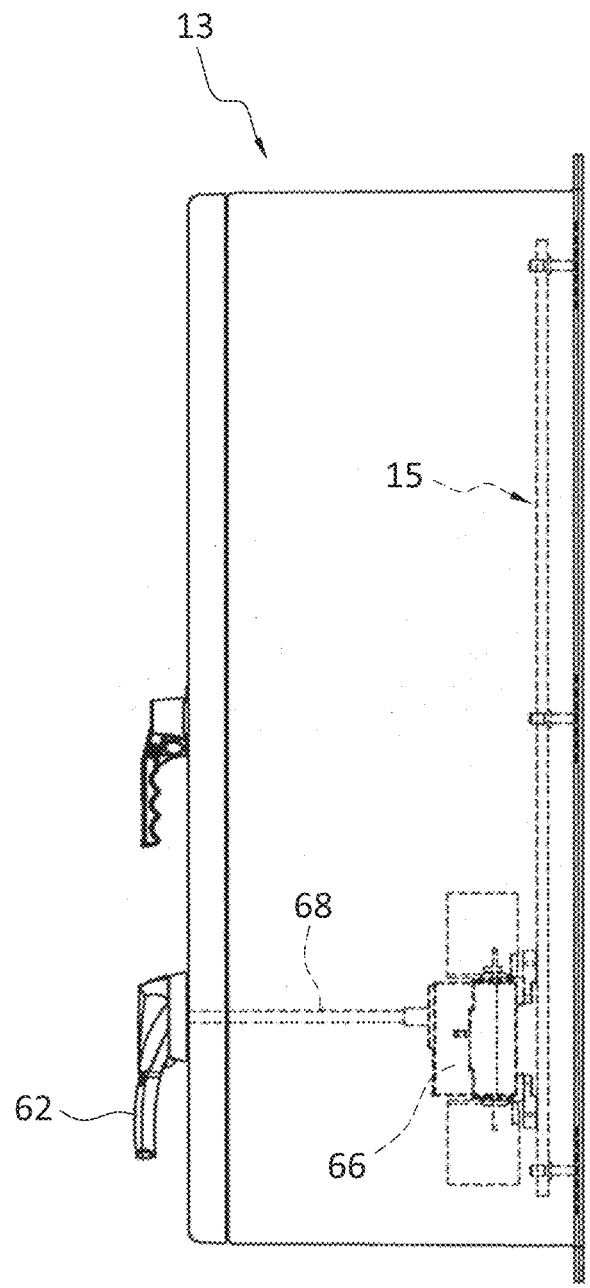
FIG. 4B is a side view of the junction box of FIG. 4A, illustrating in phantom the linkage between the handle of the door panel and the safety (or "kill") switch of the junction box.

Turning now to FIGS. 4A and 4B, each junction box 13 has a door panel 60 with a door handle 62 that affords access to the switching assembly 15 contained therein. The door handle 62 is mechanically linked to both a latch mechanism 63 that includes upper and lower latches 64*a* and 64*b*, and a safety switch 66 that disconnects the input cable 18 from the switching assembly 15. In particular, a pivot rod 68 connects handle 62 to a rotary switch mechanism in safety switch 66 such that when the handle 62 is turned 90°, the upper and lower latches 64*a*, 64*b* become unlatched and the safety switch 66 becomes open, thereby breaking all connection between the 750 volt DC input cable 19 and the interior of the box 13. In the preferred embodiment, safety switch 66 includes four pairs of contacts to suppress arcing. As is shown in FIG. 4A, the door panel 60 also includes indicator lights 70*a-d* that indicate that current is flowing through each of the ribbon heaters 37*a-d*. Also included on the door panel 60 is a push-button test switch 74 that tests whether or not the light bulbs used in the indicator lights 70*a-d* are operative.

Figure 5:
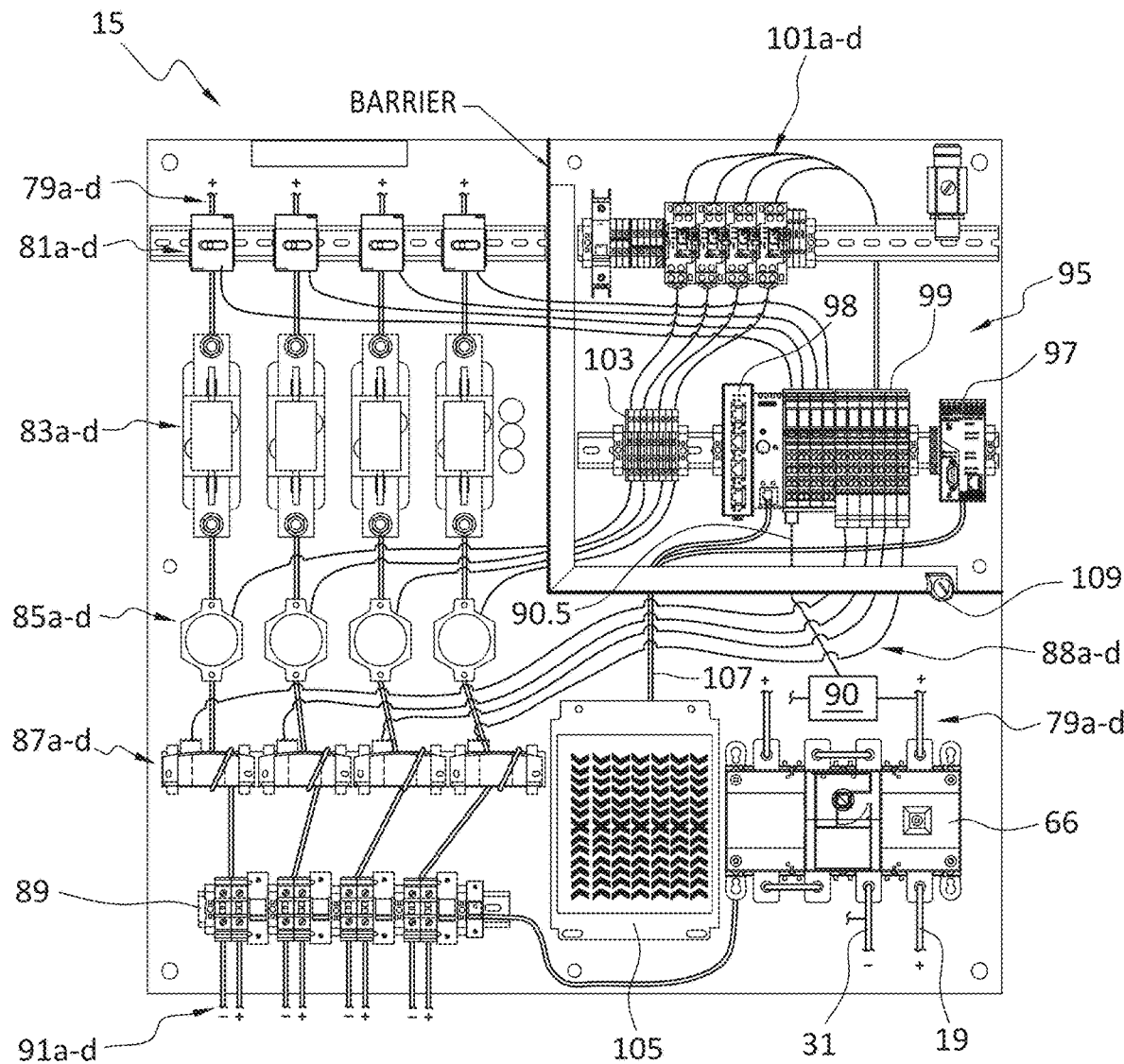
FIG. 5 is a front view of the switching assembly contained within the junction box of FIG. 4A.
Figure 6A:
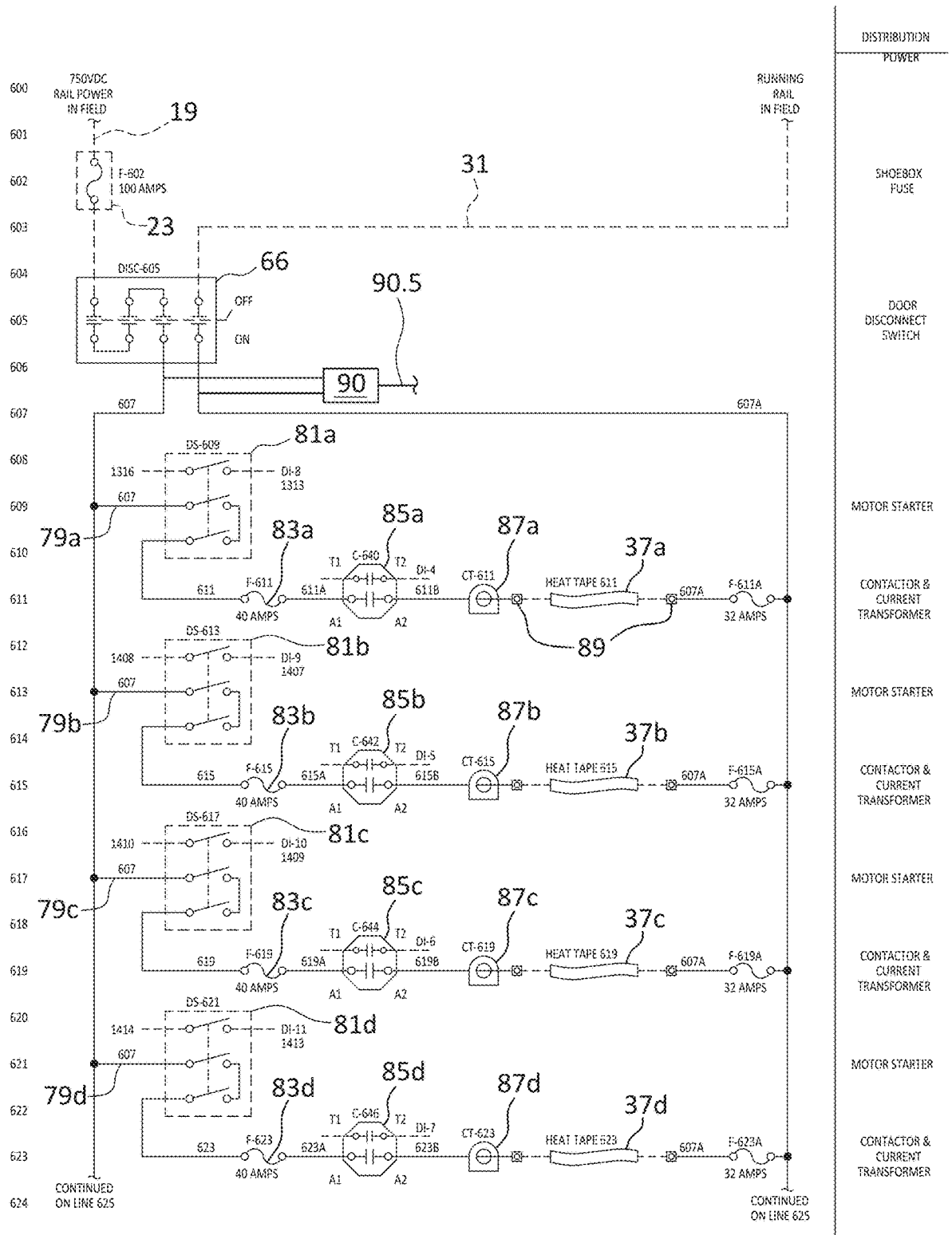
FIG. 6A is a schematic wiring diagram of the components on the left side of the switching assembly illustrated in FIG. 5.

FIGS. 5 and 6A illustrate the details of the switching assembly 15 contained within the junction box 13. The previously-discussed safety switch 66 includes an input terminal connected to the 750 volts DC input cable 19, and an output terminal, to which four output cables 79*a-d* are connected which in turn carry 750 volts DC when the safety switch 66 is closed. Output cables 79*a-d* are in turn connected to manual switches 81*a-d*, respectively. The provision of such manual switches 81*a-d* allows the 750 volts DC current to be turned off with respect to a particular ribbon heater power circuit to allow such maintenance operations as the replacement of one of the ribbon heaters or the replacement of fuses downstream of the manual switches 81*a-d*. The manual switches 81*a-d* are connected to the programmable logic circuit (PLC) 99 as shown provide an electrical signal to the PLC 99 as to whether they are open or closed. The PLC 99 in turn conducts a 24 volt DC current to the indicator lights 70*a-d* when the switches 81*a-d* are closed, but does not conduct such a current to a particular indicator light 70*a-d* whenever its respective manual switch 81*a-d* has been opened. The output terminals of the manual switches 81*a-d* are in turn connected to fuses 83*a-d* which prevent an over-current condition from damaging components downstream thereof. In the preferred embodiment, fuses 83*a-d* have a 40 amp capacity even though their respective ribbon heaters 37*a-d* have about a 30 amp operating draw in view of the fact that the current draw of such heaters in an initial "cold" state is substantially more than their draw during normal operation after reaching a thermal steady state. The current output from each of the fuses 83*a-d* is in turn connected to the inputs of electrically-controlled switches 85*a-d*. As will be explained in greater detail hereinafter, the closed or open state of the switches 85*a-d* is determined by the switch controller 95 which includes a transceiver 97 a programmable logic circuit 99. Switches 85*a-d* are preferably vacuum-type switches to avoid arcing which could otherwise occur during the opening or closing of their internal contacts.

Cables 79*a-d* conduct the current flowing out of the electrically-controlled switches 85*a-d* through current sensors 87*a-d*, respectively. In the preferred embodiment, each of the current sensors 87*a-d* is a MCR-SL-CUC-100-U universal current transducer (model no. 2308108) manufactured by Phoenix Contact located in Middletown, Pa. Preferably, to enhance the sensitivity of the current sensors 87*a-d*, the cables 79*a-d* are looped around the ring of the sensors in the manner indicated in FIG. 5. Such current sensors 87*a-d* are capable of detecting a change in current of 0.2 amps or lower, which means they are capable of detecting when a single one of the dozens of heating elements 41 ceases to operate in its respective ribbon heater 33*a-d*. Each current sensor 87*a-d* has an output wire 88*a-d*, respectively, that is connected to an input of the programmable logic circuit 99 of the switch controller 95 which relays this current information to the memory of the master control station 3 via its transceiver 97.

To complement the monitoring and diagnostic function of the current sensors 87*a-d*, the junction boxes 13 each further contain a voltage sensor 90 that is likewise shown in FIGS. 5 and 6A. Voltage sensor 90 is located immediately downstream of the safety switch 66 and is connected between the input cable 19 and the ground cable 31. Voltage sensor 90 has an output wire 90.5 that is in turn connected to the input of the programmable logic circuit 99 of the switch controller 95. In the preferred embodiment, the voltage sensor 90 is a Swartz model C4280-901 voltage transducer manufactured by SMC Electrical Products located in Barboursville, W.Va. and having a website at www.smcelectrical.com. The voltage sensor 90 continuously monitors the voltage of the input cable 19 that is connected to the 750 volts DC third rail 21 of the railway, and continuously relays this information to the memory of the master control station 3 via the transceiver 97 of the switch controller 95.

The combination of the data relayed by the current sensors 87*a-d* and the voltage sensor 90 from each of the junction boxes 13 enables the personal computer 57 of the master control station 3 not only to immediately detect malfunctions such as the burning-out of a heating element in a particular ribbon heater 33*a-d*, (and to generate an appropriate alarm signal) but further allows the personal computer 57 to accurately predict the expected lifetime of the heating elements of a particular ribbon heater 33*a-d*. For example, a baseline lifetime of each of the ribbon heaters 33*a-d* may first be determined from the recorded data generated by the current sensors 87*a-d*. Specifically, if the first set of ribbon heaters lasted, for example, for five years before heating element failure began occurring, then the baseline lifetime of each of the ribbon heaters 33*a-d* would be set at five years. This baseline lifetime can then be modified from the data generated by the voltage sensor 90. To understand how such a modification might be made and why it is important, some background is necessary.

Most electric trains employ regenerative braking to slow down or stop at a particular train station. When regenerative braking is used, the function of the electric motor of the train is changed to that of an electric generator that applies drag to train in order to slow or to stop it. Hence, instead of receiving power from the 750 volt third rail, the electric motor of the train generates and conducts electric current to the third rail. This in turn results in a power surge that substantially raises the voltage of the third rail from 750 volts to well over 1000 volts. If the ribbon heaters 33*a-d* are on at the time that a nearby train uses regenerative braking, they are subjected to the power surge generate by the electric motor of the train, which in turn applies lifetime-shortening thermal stresses to the individual heating elements of the ribbon heaters. Hence the collected voltage data supplied to the personal computer 57 of the master control station 3 by the voltage sensor 90 can be used to modify the baseline lifetime determined by the data collected from the current sensors 87*a-d*. Specifically, the baseline lifetime can be shortened into a more accurate lifetime in proportion to the duration and magnitude of all the power surges the ribbon heaters 33*a-d* are subjected caused by the amount of rail traffic employing regenerative braking traveling through the train yard.

In addition to the power surges created by regenerative braking, the ribbon heaters 33*a-d* may also be subjected to intermittent voltage surges due to the AC current applied by code reading devices used for train position monitoring. Such intermittent voltages may be high enough (e.g. ~100 volts) to further shorten the lifetime of the ribbon heaters 33*a-d*. Again, the data provided by the continuous monitoring of all such surges by the voltage sensor 90 allows the personal computer 57 to consider such data and to generate an even more accurate projected lifetime for each of the ribbon heaters 33*a-d*.

Downstream of the current sensors 87*a-d* the cables 79*a-d* are connected to an input of a terminal block 89 which contains a 32 amp fuse for each ribbon heater circuit. Ground cable 31 is also connected to the terminal block 89 via the safety switch. From the out of the terminal block 89 four pairs of heater circuit wires 91*a-d* are formed. Each of these pairs of circuit wires 91*a-d* are connected to one of the ribbon heaters 37*a-d* as is most easily seen in FIG. 6A.

Figure 6B:
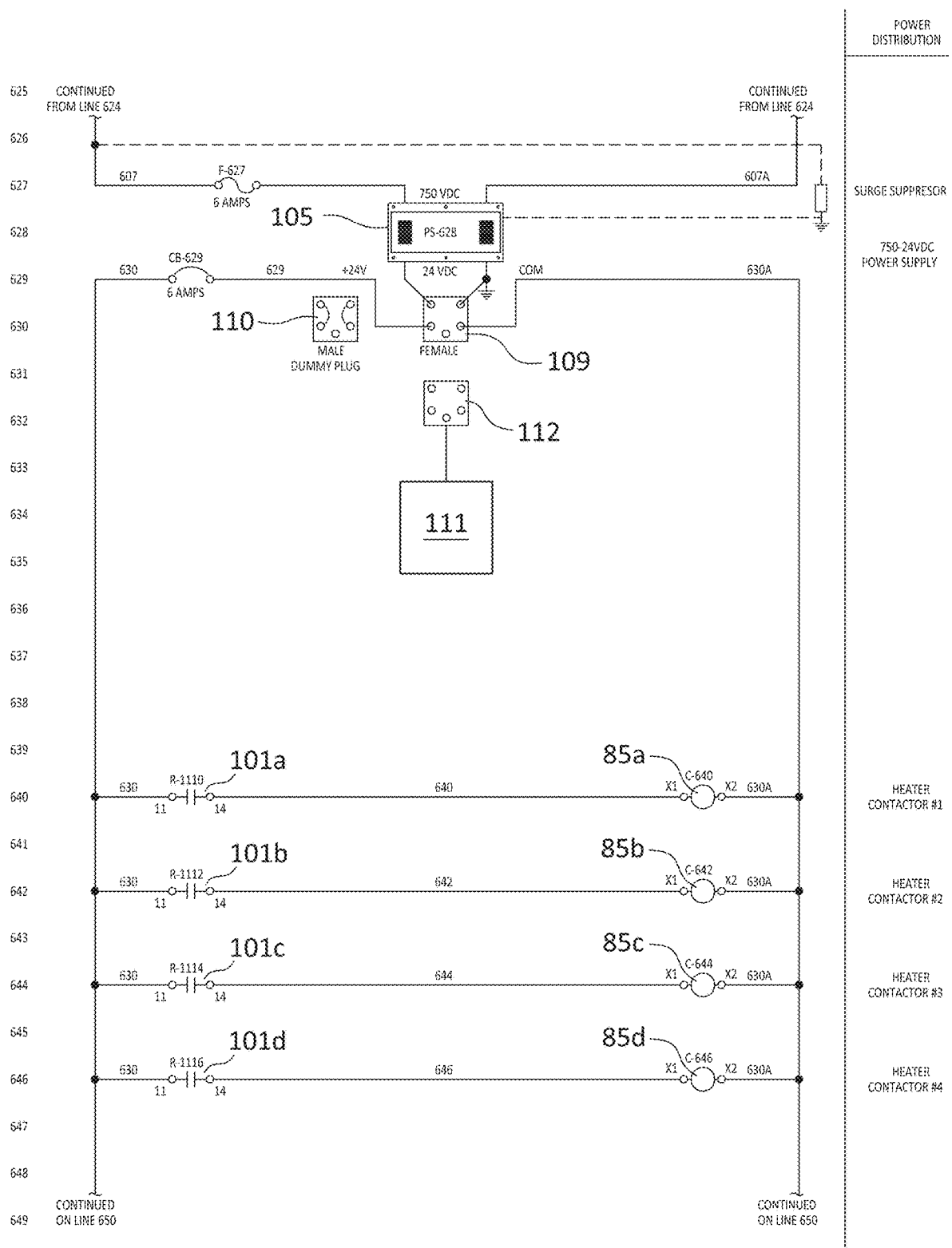
FIG. 6B is a schematic wiring diagram of the step-down power supply within the junction box and its connection to the indicator lights that indicate the "on-off" status of the particular ribbon heaters powered by the junction box, as well as the auxiliary power supply (indicated in phantom) that powers the transceiver, the programmable logic circuit (PLC), and the "on-off" status lights after the safety switch kills the 750 volt DC current to the switching assembly.

With reference again to FIGS. 5 and 6B the transceiver 97 of the switch controller 95 is connected to the antenna 17 shown in FIG. 1, and to the PLC 99 via an Ethernet switch 98. Output wires 101*a-d* of the PLC 99 are connected to control inputs of the switches 85*a-d* such that the open or closed state of the switches 85*a-d* is determined by the electrical signals generated by the PLC 99 via the wires 101*a-d*. Isolating relays 101*a-d* are interposed between the PLC 99 and the electrically controlled switches 85*a-d* to prevent any possibility of a damaging current surge from the switches 85*a-d* being transmitted to the PLC 99. A terminal block 103 facilitates connection between the outputs of the isolating relays 101*a-d* and the control inputs of the electrically-controlled switches 85*a-d*. A power supply 105 supplies power to the transceiver 97 and the PLC 99. As is schematically shown in FIG. 6B, the power supply 105 converts the 750 volts DC power from the input cable 19 to a non-lethal 24 volts DC current appropriate for the operation of the components of the switch controller 95, and conducts the converted current to the transceiver 97 and PLC via an output cable 107 shown in FIG. 5. As is best seen in FIG. 6B, a power input connecter 109 is provided at the output of the power supply 105. In the event that the power supply 105 ceases to provide power to the components of the switch controller 95 (as would happen for example when the door panel 60 were opened and the safety switch 66 actuated) a power output connector 110 of an auxiliary power supply 111 (which may be a portable battery pack) may be connected to the power input connector 109, thereby providing operable power to the transceiver 97 and PLC 99 of the switch controller 95.

Figure 6C:
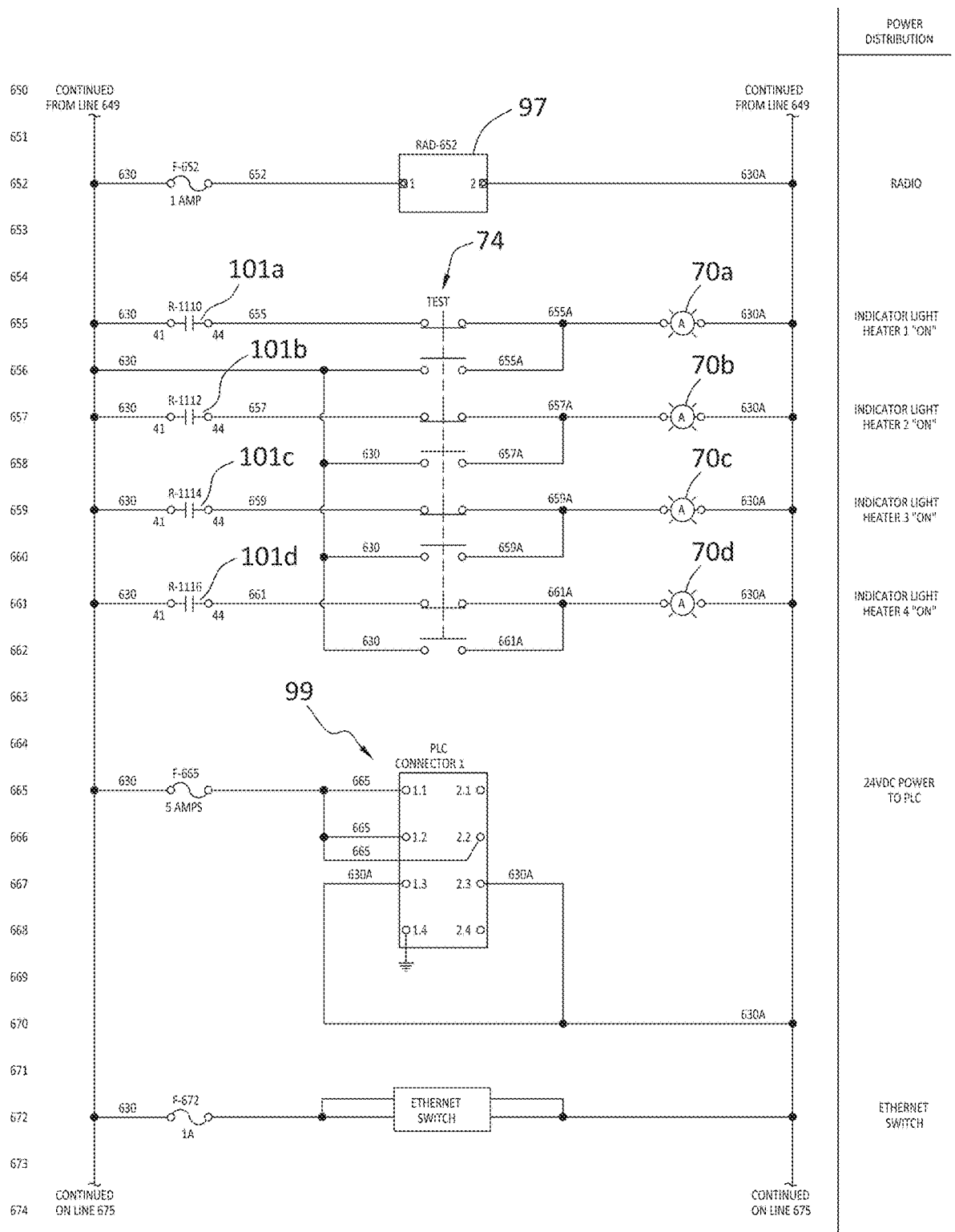
FIG. 6C is a schematic wiring diagram of the components located in the upper right quadrant of the switching assembly shown in FIG. 5 (i.e. the transceiver, the PLC, and the isolating relays connected between the output of the PLC and the input of the electrically controlled switches on the left side of the switching assembly.
Figure 7:
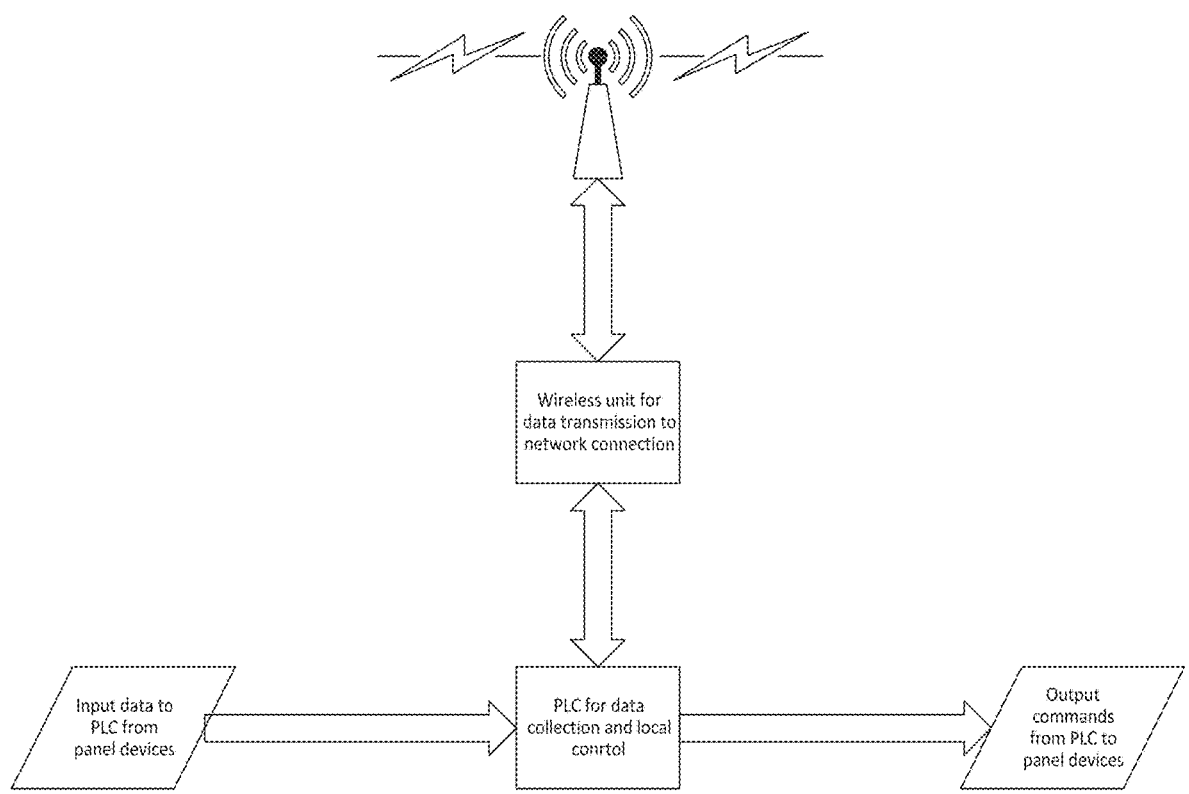
FIG. 7 is a schematic diagram of the information flow between the junction boxes, local relay units, and digital control unit of the system.
Figure 8:
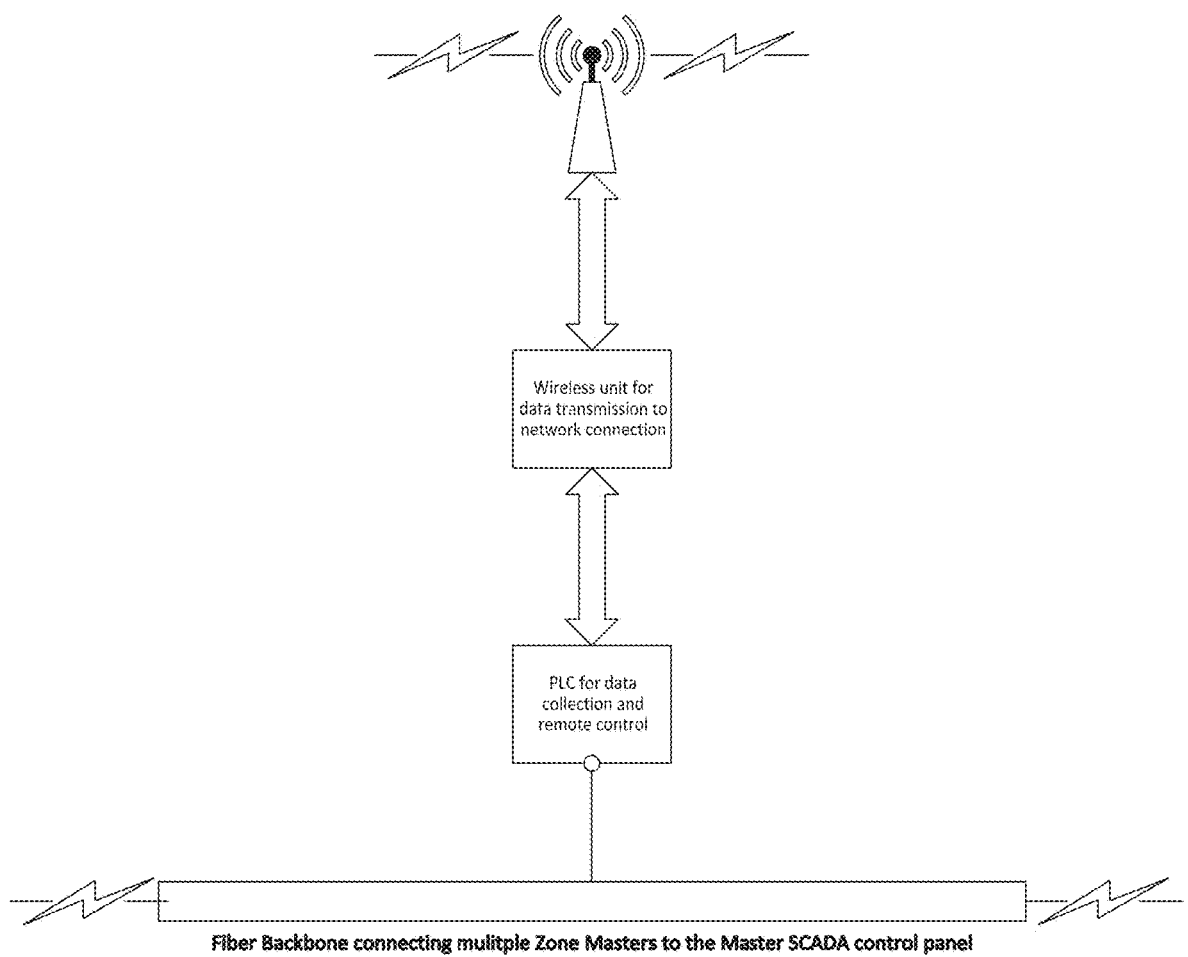
FIG. 8 schematically illustrates the radio links and the optical cable links between the junction boxes, local relay units, and digital control unit of the system.
Figure 9:
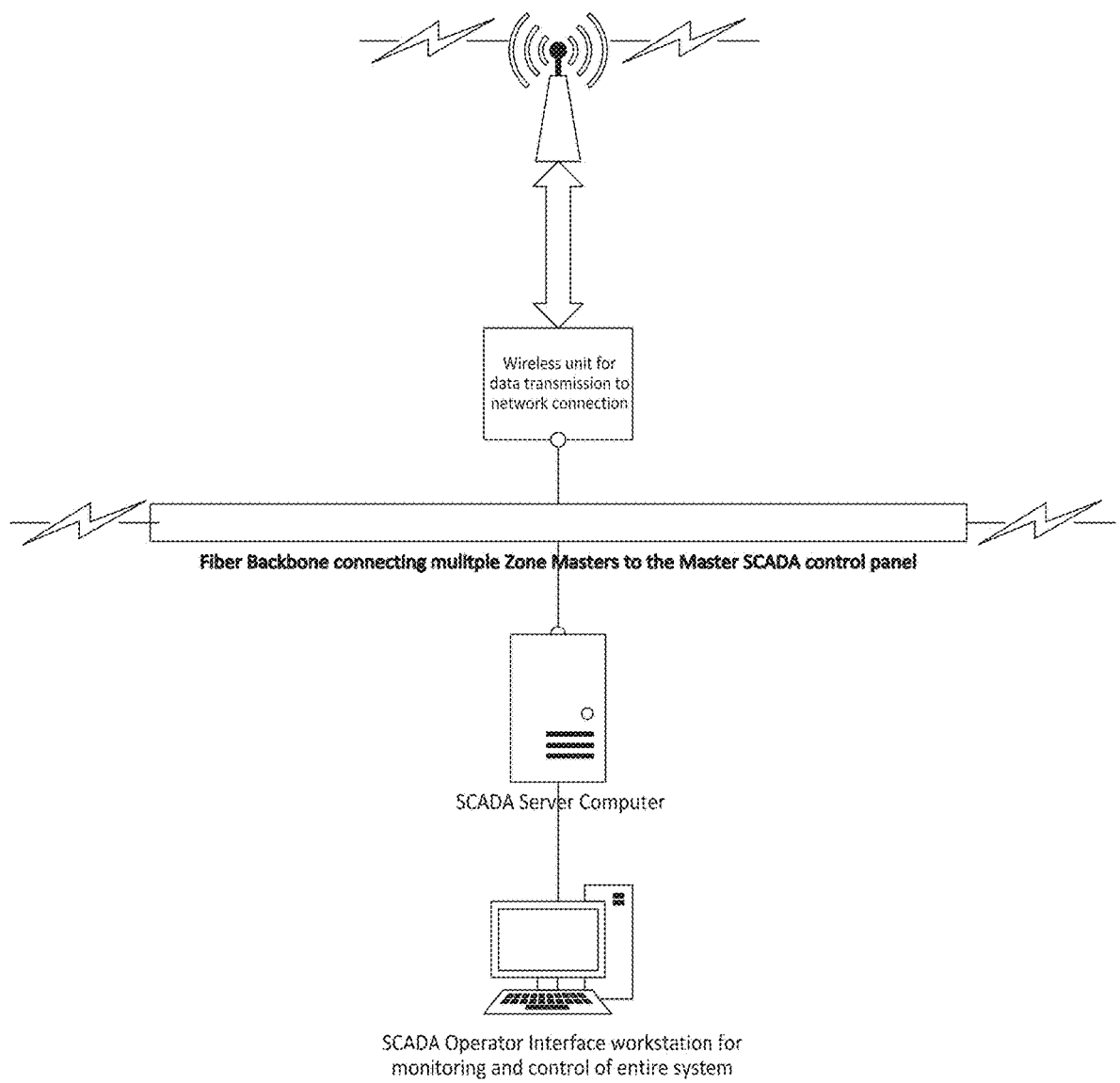
FIG. 9 is a schematic diagram of the communications flow between the components of the digital control unit of the system.

FIG. 6C illustrates the connections between the 24 volts DC power supply 105 and the transceiver 97, the PLC 99, the indicator lights 70a-d, and the test switch 74. Normally, when the PLC 99 transmits a "close switch" command to the electrically-operated switches 85a-d, each of the isolating relays 101a-d are closed to relay 24 volts DC to the inputs of not only the switches 85a-d, but also the indicator lights 70a-d. As is evident in FIG. 6A, push-button test switch connects the 24 volt DC current to the indicator switches 70a-d even when the isolating relays 101a-d are open, which would occur when the door panel 60 has been opened and the safety switch 66 actuated.

Figure 10A:
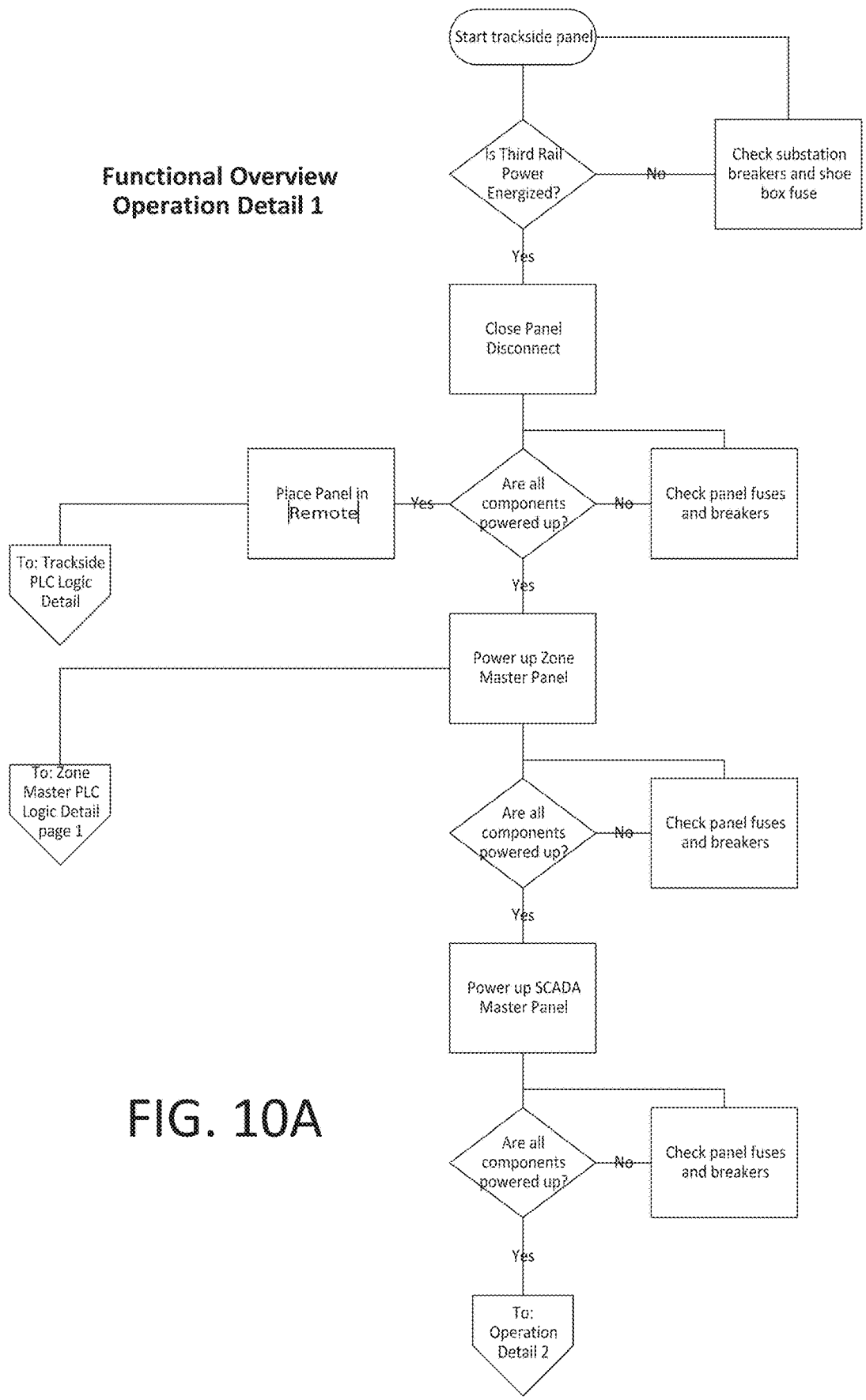
FIGS. 10A and 10B are a flowchart generally illustrating the operational steps taken by the PLC of a junction box switching assembly when first actuated.
Figure 10B:
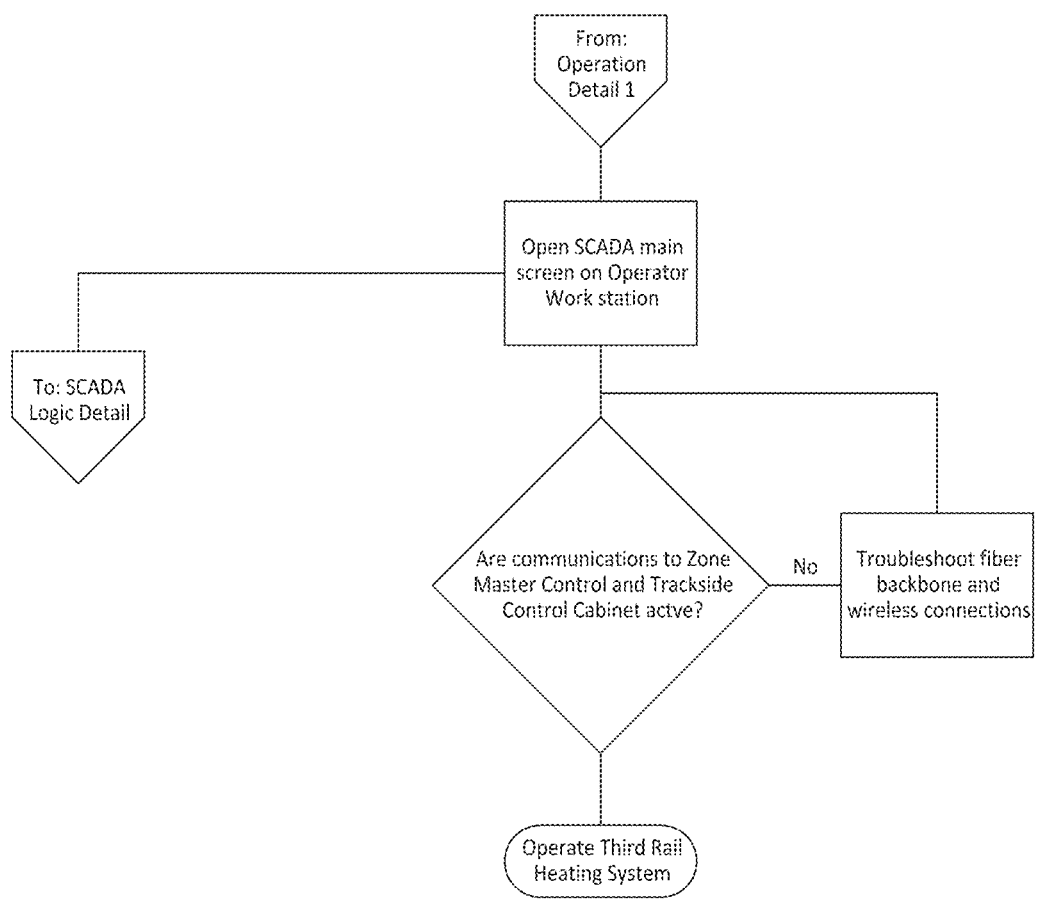

FIGS. 10A and 10B are a flowchart generally illustrating the operational steps taken by the operator to start the system 1. The operator first checks if the third rail 21 is energized. If not, he checks to see if the substation circuit breakers are closed and if the shoebox fuse 23 is conductive. If so, the operator then checks to see if the safety switch 66 is closed. If so, he inquires whether all of the components of the switching assembly are receiving a flow of the 750 volts DC power from the third rail 21. If so, he then powers up the local relay unit 5 located at the railway station, and inquires whether all of the components of the unit 5 are receiving power. In the remaining steps illustrated in FIGS. 10A and 10B, the operator powers up the master control station 3 and likewise inquires whether all of the components of the station 3 are receiving power. After the booting up and component checking of the switching assembly 15, the local relay units 5 and the master control station 3 has been completed, the system 1 proceeds to conduct the 750 volts DC power from the third rail to its specific ribbon heaters 37a-d.

Figure 11:
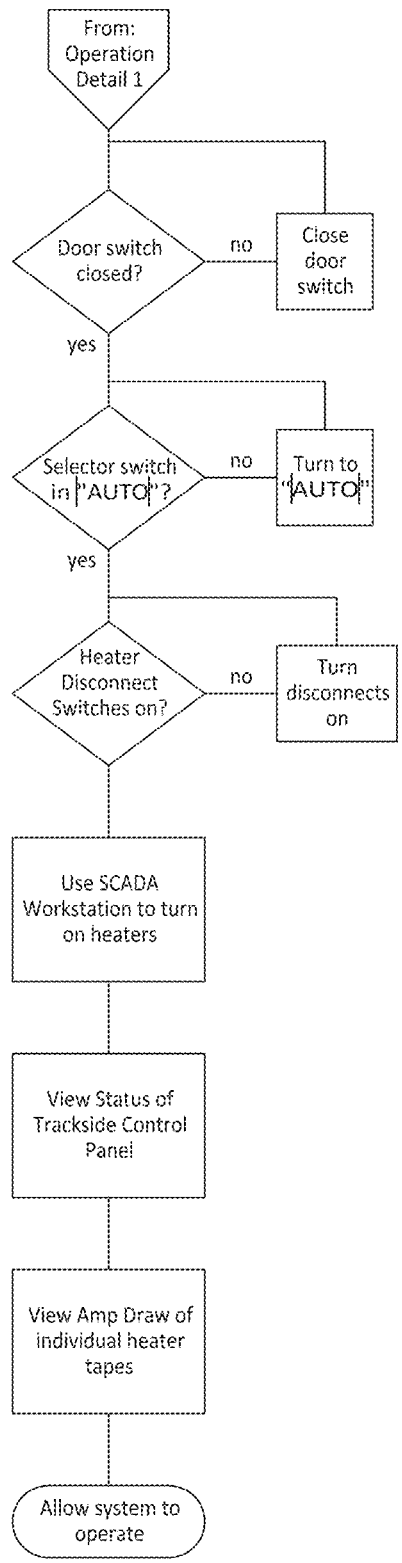
FIG. 11 is a flowchart illustrating the specific operational steps taken by the PLC to initiate actuation of the ribbon heaters powered by its particular switching assembly.
Figure 12A:
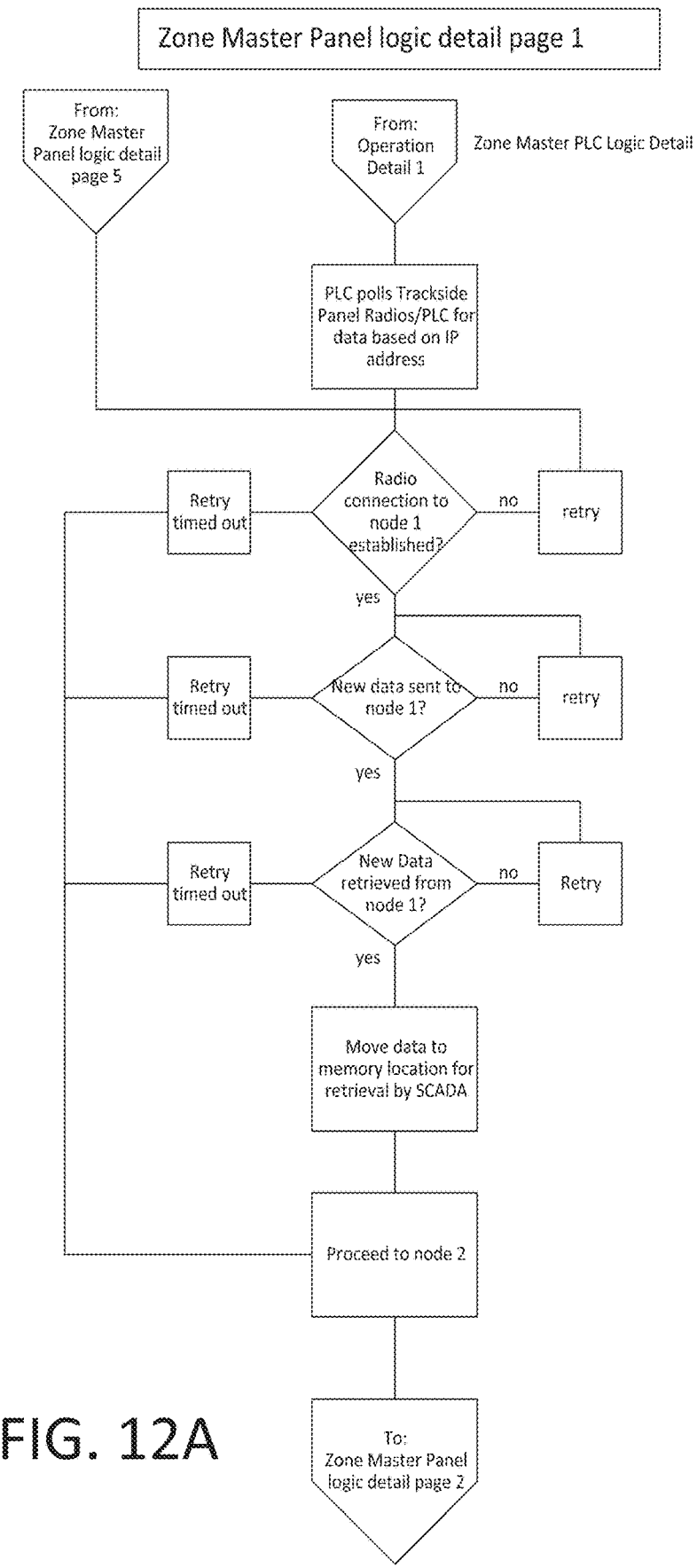
FIGS. 12A-12E are a flowchart illustrating in detail the operational steps taken by the system after the ribbon heaters have been actuated.
Figure 12B:
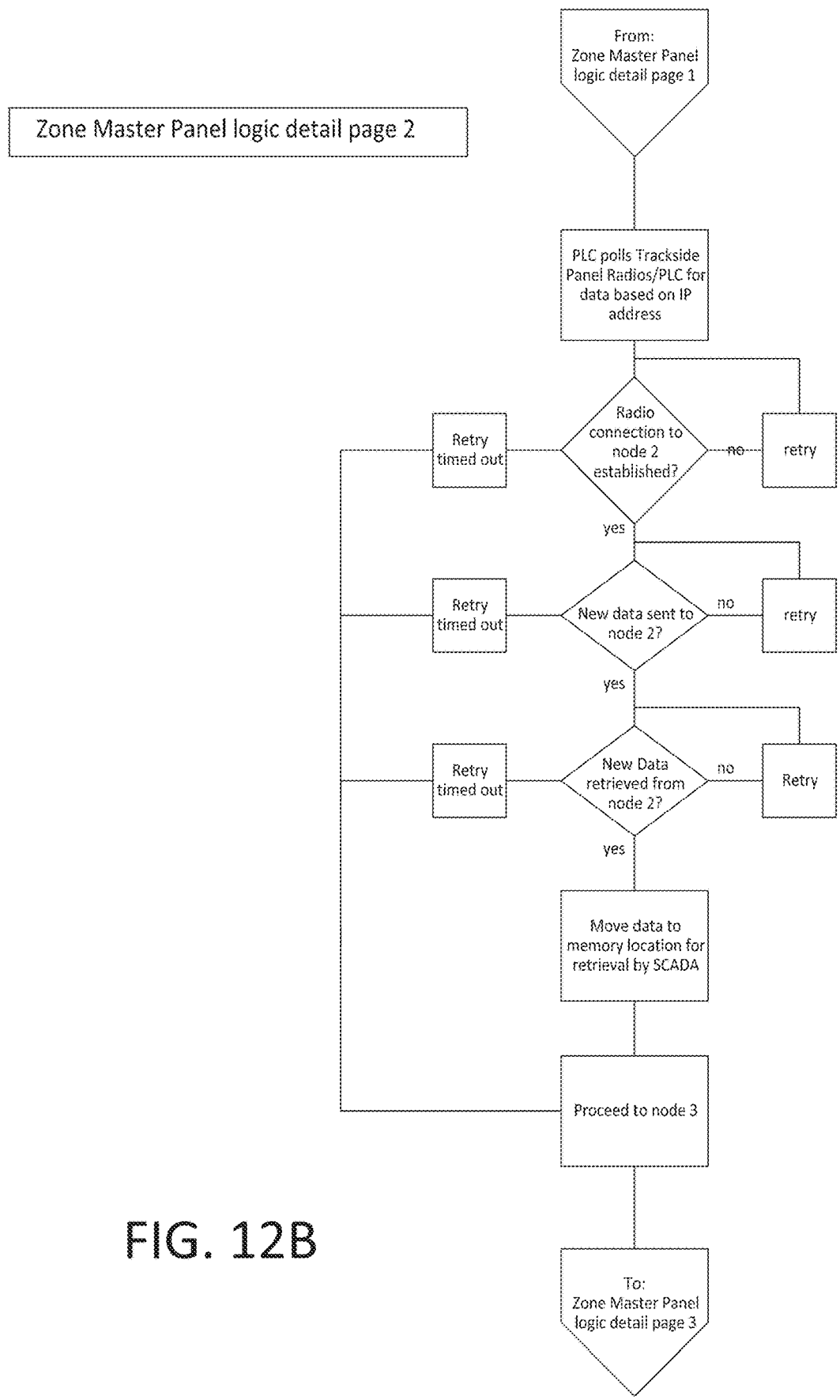
Figure 12C:
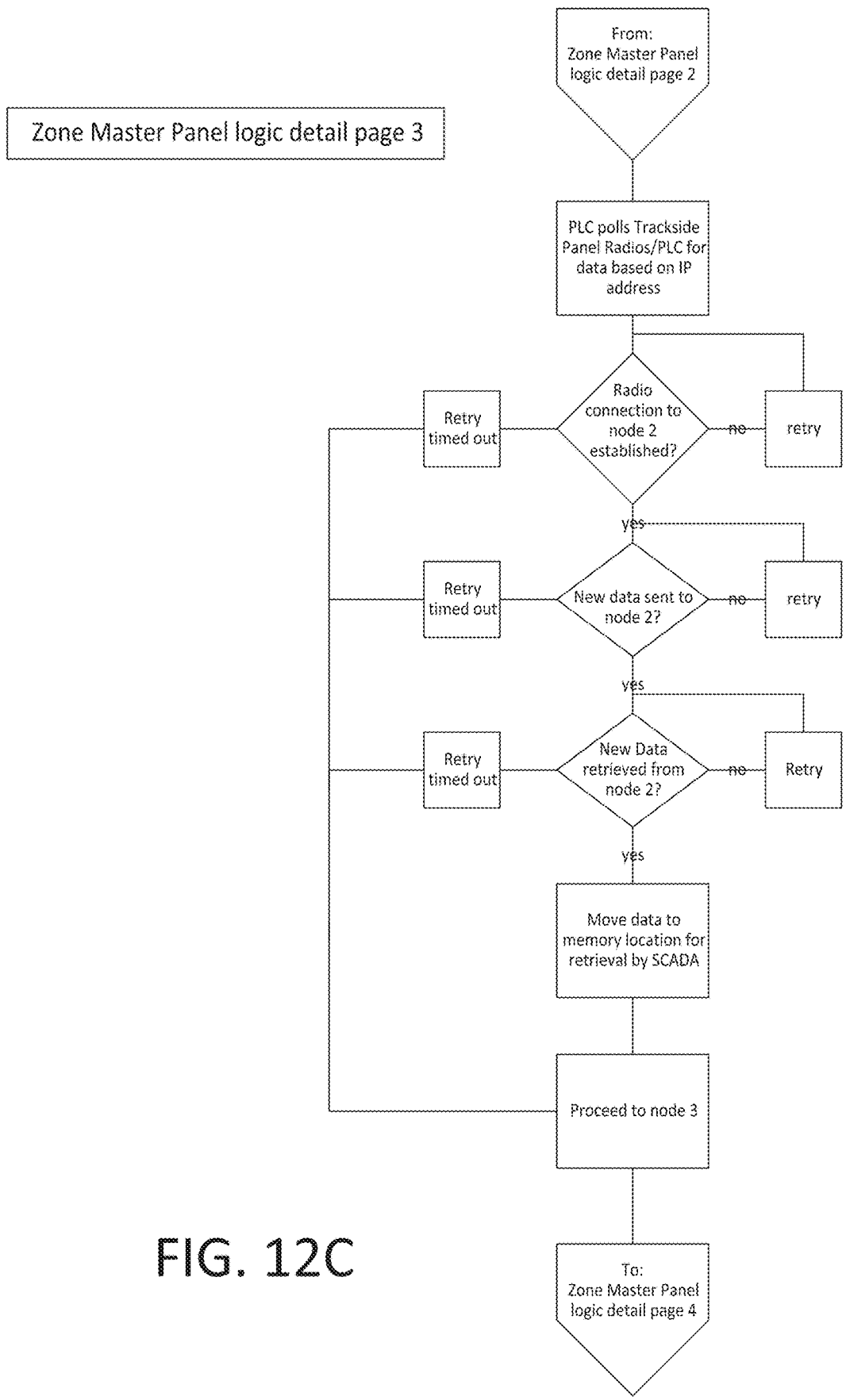
Figure 12D:
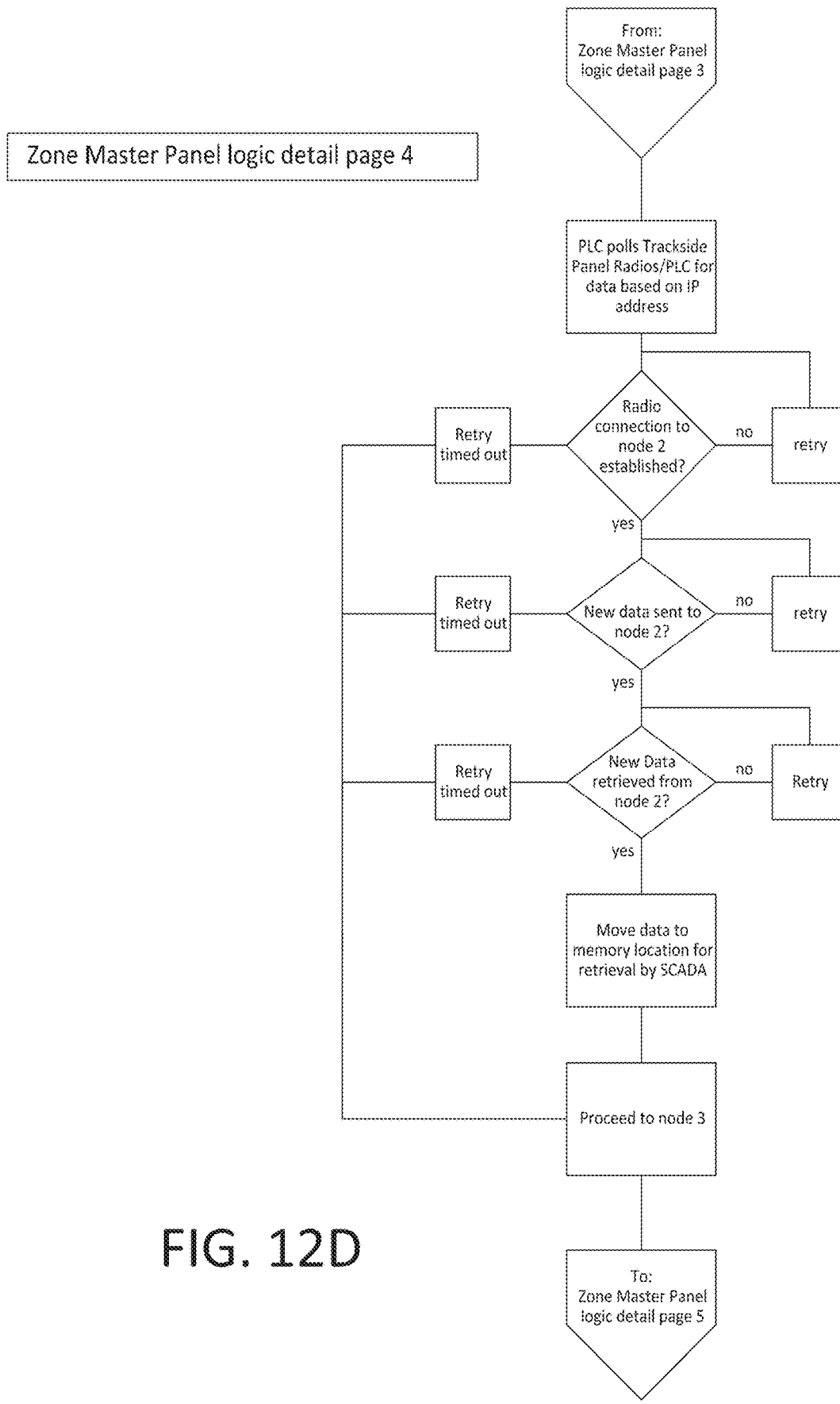
Figure 12E:
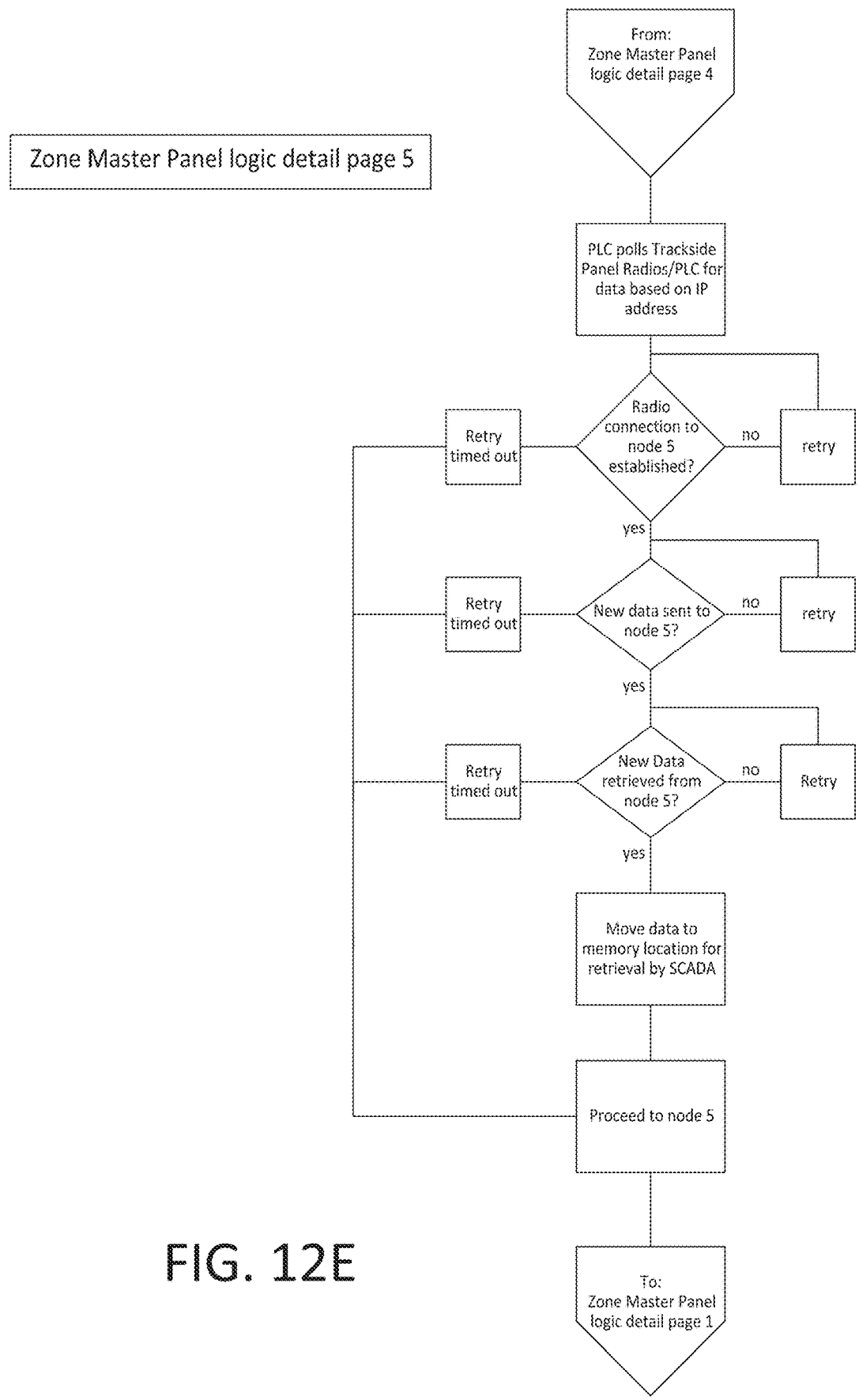
Figure 13:
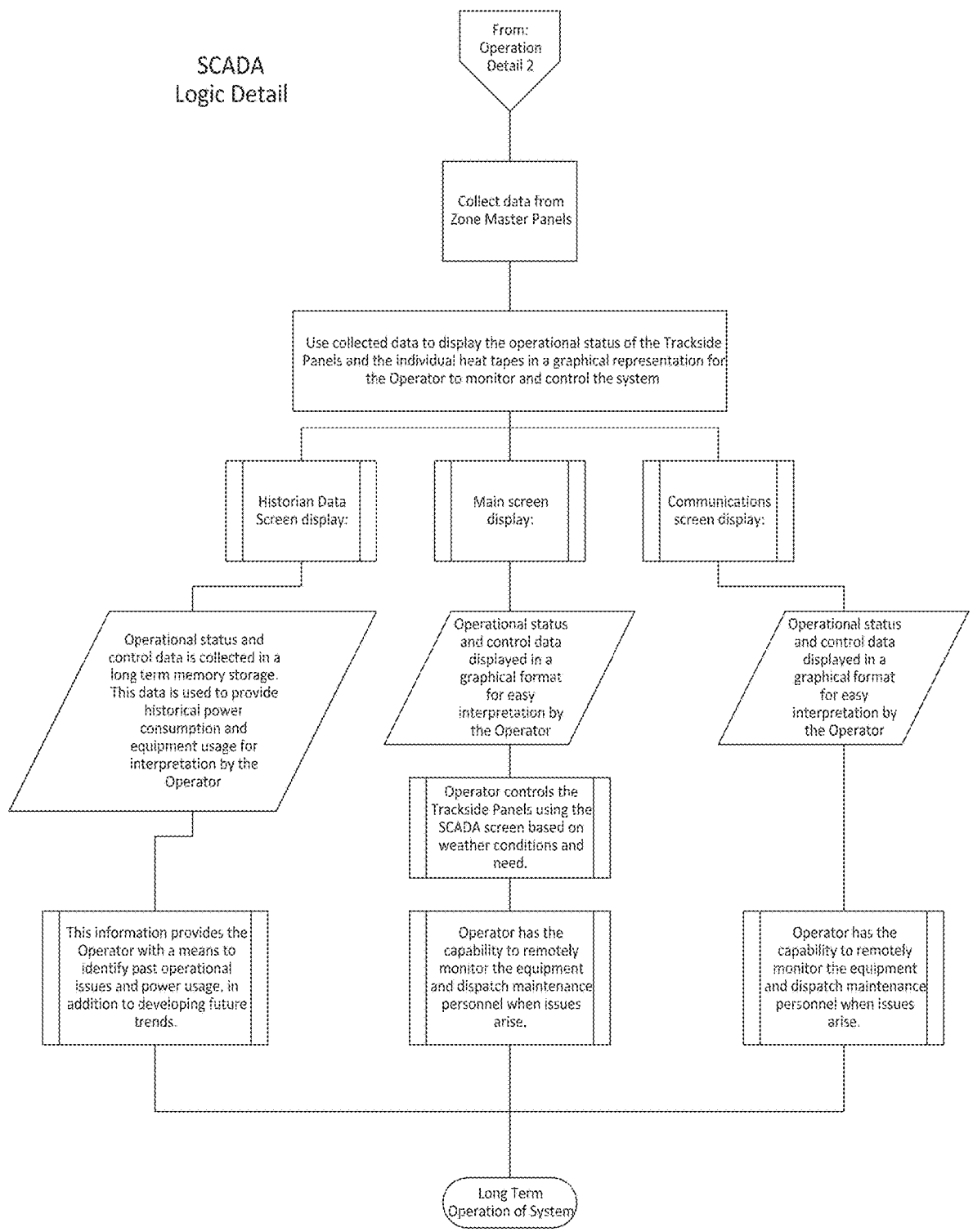
FIG. 13 is a logic detail of the digital control unit.

FIG. 11 is a flowchart illustrating the specific operational steps taken by the PLC 99 to initiate actuation of the ribbon heaters 37a-d powered by its particular switching assembly 15. While not specifically indicated in this flowchart, the master control station sequentially actuates the ribbon heaters 37a-d so as not to apply too great a load on the third rail 21 would might otherwise interfere with the smooth operation of any trains near the junction box 13.

FIGS. 12A-12E are a flowchart illustrating in detail the operational steps taken by the system 1 after the ribbon heaters have been actuated. Upon the actuation of all of the ribbon heaters 37a-d, the current sensors 87a-d and voltage sensor 90 continuously send a signal to the PLC 99 indicative of the real-time current draw and voltage experienced by each of the ribbon heaters 37a-d. This current draw and voltage data is periodically relayed from the PLC 99 to the memory of the server 51 via the radio link between the transceivers 97 and 7 of the switching assembly 15 and local relay unit 7, respectively, and the optical link via the optical cable 10.

Although the invention has been described in detail with particular reference to a preferred embodiment, it will be understood that variations and modifications can be effected within the spirit and scope of the invention. Other modifications, variations, and additions to the invention will become apparent to persons of skill in the art, and all such modifications, variations, and additions are intended to be within the scope of this invention, which is limited only by the claims appended hereto and their various equivalents.

The invention claimed is:

1. A system for remotely controlling a plurality of ribbon heaters serially mounted along a length of a third rail of a railway, wherein each of the ribbon heaters has a plurality of heating elements along its length, comprising:
   a digital controller;
   a switching assembly located remotely from the digital controller and electrically connected to the third rail of the railway, including
      a plurality of electrically-controlled switches, each of which selectively switches electrical current from the third rail to the plurality of ribbon heaters;
      a switch controller including a programmable logic circuit in communication with the digital controller that provides control signals to each of the plurality of electrically-controlled switches in response to switching commands received from the digital controller;
      current sensors that continuously provide a signal indicative of current flow through each ribbon heater to the digital controller, and
      a voltage sensor that continuously provides a signal indicative of the voltage applied to each ribbon heater to the digital controller,
   wherein the digital controller detects when a failure condition has occurred in one of the plurality of ribbon heaters, and predicts when a failure condition is likely to occur in one of the plurality of ribbon heaters based on previously detected failure conditions, and the current flow and voltage information provided by the current sensors and voltage sensor.

2. The system defined in claim 1, wherein the current sensors are sufficiently sensitive to provide a signal indicative of a difference in current draw when a single heating element in one of the plurality of ribbon heaters ceases to draw power.

3. The system defined in claim 1, wherein the digital controller records the magnitude and length of time of voltage surges experienced by the plurality of ribbon heaters and predicts when a failure condition is likely to occur in one of the plurality of ribbon heaters based on such recorded information.

4. The system defined in claim 1, further comprising a junction box having a door panel that contains the switching assembly, and a safety switch that breaks electrical contact between the switching assembly and the third rail when the door panel of the junction box is opened.

5. The system defined in claim 4, wherein the safety switch is mechanically connected to an opening handle on the door panel of the junction box such that the safety switch breaks electrical contact between the switching assembly and the third rail when the opening handle is operated.

6. The system defined in claim 1, wherein the digital controller and the switch controller each include radio transceivers for conducting the switching commands from the digital controller to the programmable logic circuit and current and voltage information from the programmable logic circuit to the digital controller.

7. The system defined in claim 1, wherein the switching assembly further comprises a power supply for the switch controller that reduces the voltage of the electricity received from the third rail to about 30 volts or less.

8. The system defined in claim 1, further comprising a portable auxiliary power supply for supplying power to the switch controller when current from the third rail to the switching assembly is shut off.

9. The system defined in claim 1, wherein the switching assembly further includes a plurality of isolating relays connected between control signal outputs of the programmable logic circuit and control signal inputs of the electrically-controlled switches.

10. The system defined in claim 1, wherein the electrically-controlled switches are vacuum switches for avoiding arcing.

11. A system for remotely controlling a plurality of ribbon heaters serially mounted along a length of a third rail of a railway, wherein each of the ribbon heaters has a plurality of heating elements along its length, comprising:
- a junction box located proximate to a third rail of a railway and having a door panel;
- a digital controller located remotely from the junction box;
- a switching assembly contained within the junction box including
  - a plurality of electrically-controlled switches, each of which selectively switches electrical current from the third rail to the plurality of ribbon heaters;
  - a switch controller including a programmable logic circuit that provides control signals to each of the plurality of electrically-controlled switches in response to switching commands received from the digital controller;
  - current sensors that continuously provide a signal indicative of current flow through each ribbon heater to the wireless controller, and
  - a safety switch that breaks electrical contact between the switching assembly and the third rail when the door panel of the junction box is opened.

12. The system defined in claim 11, wherein the safety switch is mechanically connected to an opening handle on the door panel of the junction box such that the safety switch breaks electrical contact between the switching assembly and the third rail when the opening handle is operated.

13. The system defined in claim 11,
wherein the switching assembly further includes a voltage sensor that continuously provides a signal indicative of the voltage applied to each ribbon heater to the digital controller, and
wherein the digital controller detects when a failure condition has occurred in one of the plurality of ribbon heaters, and predicts when a failure condition is likely to occur in one of the plurality of ribbon heaters based on previously detected failure conditions, and the current flow and voltage information provided by the current sensors and voltage sensor.

14. The system defined in claim 11, further comprising a portable auxiliary power supply for supplying power to the switch controller when the door panel of the junction box is opened.

15. A system for remotely controlling a plurality of ribbon heaters serially mounted along a length of a third rail of a railway, wherein each of the ribbon heaters has a plurality of heating elements along its length, comprising:
- a switching assembly located remotely from the digital controller and electrically connected to the third rail of the railway, including
  - plurality of electrically-controlled switches, each of which selectively switches electrical current from the third rail to the plurality of ribbon heaters;
  - a switch controller including a radio transceiver connected to a programmable logic circuit that provides control signals to each of the plurality of electrically-controlled switches;
  - a power supply that provides power to the controller from electricity received from the third rail that has been converted into electricity having a voltage of about 30 volts or less;
  - current sensors that continuously provide a signal indicative of current flow through each ribbon heater to the wireless controller, the current sensors being sufficiently sensitive to provide a signal indicative of a difference in current draw when one of the heating elements ceases to draw power and
- a digital controller remotely located from the junction box that includes a radio transceiver in communication with the transceiver of the switch controller, wherein the digital controller provides switching commands to the wireless controller and continuously records the current flow signals provided to the wireless controller from the current sensors.

16. The system defined in claim 15,
wherein the switching assembly further includes a voltage sensor that continuously provides a signal indicative of the voltage applied to each ribbon heater to the digital controller, and
wherein the digital controller detects when a failure condition has occurred in one of the plurality of ribbon heaters, and predicts when a failure condition is likely to occur in one of the plurality of ribbon heaters based on previously detected failure conditions, and the current flow and voltage information provided by the current sensors and voltage sensor.

17. The system defined in claim 15, wherein the digital controller includes local relay units located at railway stations that include the radio transceiver in communication with the transceiver of the wireless controller, and a master control station located remotely with respect to the local control units.

18. The system defined in claim 17, wherein the master control station is connected to the local relay units via an optical fiber cable.

19. The system defined in claim 15, wherein the master control station, upon initial actuation of the local relay units, first determines whether or not an electrical current is present in the third rail connect to the junction box, then proceeds to test the operability of other components of the switching assembly, and finally connects the strip heaters to the electrical current from the third rail in sequential fashion such that the electrical load on the third rail is gradually applied.

20. The system defined in claim 15, further comprising a junction box having a door panel that contains the switching assembly, and a safety switch that breaks electrical contact between the switching assembly and the third rail when the door panel of the junction box is opened.

* * * * *